US012694230B2

(12) United States Patent
Sharma et al.

(10) Patent No.: US 12,694,230 B2
(45) Date of Patent: Jul. 28, 2026

(54) MULTI-STAGE MULTI-HOP NATURAL LANGUAGE AND MODEL EXECUTION PLAN GENERATION

(71) Applicant: MICROSOFT TECHNOLOGY LICENSING, LLC, Redmond, WA (US)

(72) Inventors: Pramod Kumar Sharma, Seattle, WA (US); Arindam Mitra, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 266 days.

(21) Appl. No.: 18/375,418

(22) Filed: Sep. 29, 2023

(65) Prior Publication Data

US 2025/0111164 A1     Apr. 3, 2025

(51) Int. Cl.
*G06F 40/40*     (2020.01)
*G06F 8/41*     (2018.01)

(52) U.S. Cl.
CPC ............... *G06F 40/40* (2020.01); *G06F 8/41* (2013.01)

(58) Field of Classification Search
CPC ................................... G06F 40/40; G06F 8/41
See application file for complete search history.

(56) References Cited

U.S. PATENT DOCUMENTS

2023/0195071 A1* 6/2023 Kazmierski ........ G05B 19/4183
                                                          700/121
2023/0409615 A1* 12/2023 Khemka ................ G06V 20/68
2024/0428937 A1* 12/2024 Natarajan .............. G16H 50/20
2025/0077789 A1* 3/2025 Wittekind ............... G06F 40/30

OTHER PUBLICATIONS

Dascalu et al., A recommender agent based on learning styles for better virtual collaborative learning experiences, Computers in Human Behavior, 2015 (Year: 2015).*
Alam et al., Supporting complex workflows for data-intensive discovery reliably and efficiently, University of Saskatchewan dissertation, 2013 (Year: 2013).*

(Continued)

*Primary Examiner* — Bhavesh M Mehta
*Assistant Examiner* — Eunice Lee
(74) *Attorney, Agent, or Firm* — David Foster; Newport IP, LLC

(57)     ABSTRACT

Machine learning models are used to invoke a sequence of tools in response to a user request. A list of available tools is culled before a machine learning model selects from the remaining tools to generate a plan. The plan, which describes tool invocations in natural language, is then converted to code that can programmatically invoke the tools. In some configurations, the list of available tools is first culled by removing tools that do not appear in similarly described plans. The list may further be culled by removing tools that do not appear in plans generated by machine learning models. Then, a machine learning model is prompted to generate a final plan from the culled list and the user request. In some configurations, the final plan is converted to code by prompting a machine learning model to extrapolate from the code of similar plans.

16 Claims, 10 Drawing Sheets

(56) References Cited

OTHER PUBLICATIONS

Dasgupta, et al., "Collaborating with language models for embodied reasoning", in Repository of arXiv:2302.00763v1, Feb. 1, 2023, 14 Pages.

Huang, et al., "Inner Monologue: Embodied Reasoning through Planning with Language Models", in Repository of arXiv:2207.05608v1, Jun. 12, 2022, 25 Pages.

Huang, et al., "Language Models as Zero-Shot Planners: Extracting Actionable Knowledge for Embodied Agents", in Repository of arXiv:2201.07207v2, Mar. 8, 2022, 33 Pages.

Puig, et al., "VirtualHome: Simulating Household Activities via Programs", in Repository of arXiv:1806.07011v1, Jun. 19, 2018, 9 Pages.

Song, et al., "LLM-Planner: Few-Shot Grounded Planning for Embodied Agents with Large Language Models", in Repository of arXiv:2212.04088v3, Mar. 30, 2023, 14 Pages.

Wang, et al., "Describe, Explain, Plan and Select: Interactive Planning with Large Language Models Enables Open-World Multi-Task Agents", in Repository of arXiv:2302.01560v1, Feb. 3, 2023, 20 Pages.

Wu, et al., "Visual ChatGPT: Talking, Drawing and Editing with Visual Foundation Models", in Repository of arXiv:2303.04671v1, Mar. 8, 2023, 17 Pages.

Yao, et al., "React: Synergizing Reasoning And Acting In Language Models", in Repository of arXiv:2210.03629v3, Mar. 10, 2023, 33 Pages.

* cited by examiner

Figure 1:
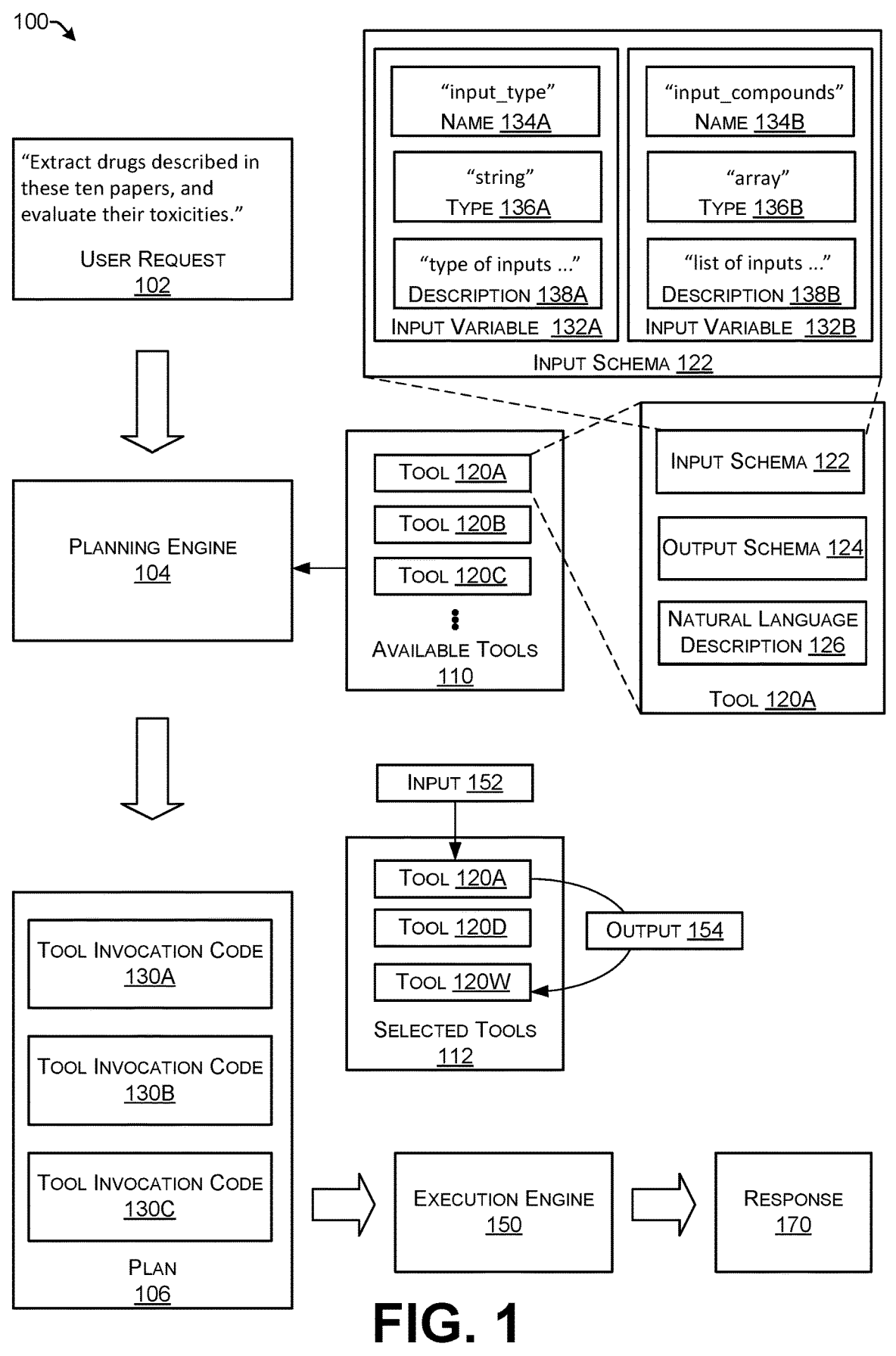

100

INPUT SCHEMA 122

"input_type"
NAME 134A

"input_compounds"
NAME 134B

"string"
TYPE 136A

"array"
TYPE 136B

"type of inputs ..."
DESCRIPTION 138A

"list of inputs ..."
DESCRIPTION 138B

INPUT VARIABLE 132A

INPUT VARIABLE 132B

"Extract drugs described in these ten papers, and evaluate their toxicities."

USER REQUEST
102

AVAILABLE TOOLS 110

TOOL 120A

TOOL 120B

TOOL 120C

⋮

TOOL 120A

INPUT SCHEMA 122

OUTPUT SCHEMA 124

NATURAL LANGUAGE DESCRIPTION 126

PLANNING ENGINE
104

SELECTED TOOLS 112

INPUT 152

TOOL 120A

TOOL 120D

TOOL 120W

OUTPUT 154

PLAN 106

TOOL INVOCATION CODE
130A

TOOL INVOCATION CODE
130B

TOOL INVOCATION CODE
130C

EXECUTION ENGINE
150

RESPONSE
170

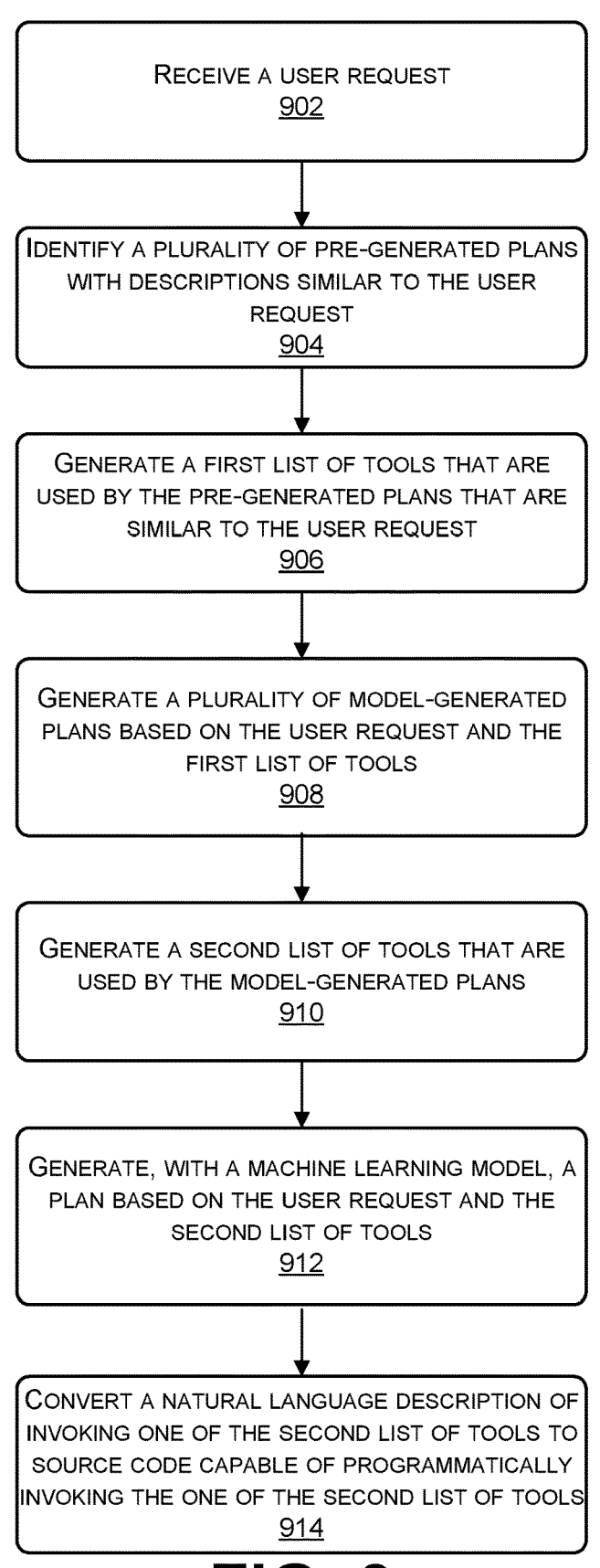

RECEIVE A USER REQUEST
902

IDENTIFY A PLURALITY OF PRE-GENERATED PLANS
WITH DESCRIPTIONS SIMILAR TO THE USER
REQUEST
904

GENERATE A FIRST LIST OF TOOLS THAT ARE
USED BY THE PRE-GENERATED PLANS THAT ARE
SIMILAR TO THE USER REQUEST
906

GENERATE A PLURALITY OF MODEL-GENERATED
PLANS BASED ON THE USER REQUEST AND THE
FIRST LIST OF TOOLS
908

GENERATE A SECOND LIST OF TOOLS THAT ARE
USED BY THE MODEL-GENERATED PLANS
910

GENERATE, WITH A MACHINE LEARNING MODEL, A
PLAN BASED ON THE USER REQUEST AND THE
SECOND LIST OF TOOLS
912

CONVERT A NATURAL LANGUAGE DESCRIPTION OF
INVOKING ONE OF THE SECOND LIST OF TOOLS TO
SOURCE CODE CAPABLE OF PROGRAMMATICALLY
INVOKING THE ONE OF THE SECOND LIST OF TOOLS
914

FIG. 9

MULTI-STAGE MULTI-HOP NATURAL LANGUAGE AND MODEL EXECUTION PLAN GENERATION

BACKGROUND

Software tools are often underutilized. Underutilization is due in part to a lack of education and awareness. Other factors include user interfaces that are not intuitive and the difficulty of finding a particular tool in a large and ever-expanding selection of software tools. For example, scientists and engineers have a large selection of tools and techniques at their disposal when researching a new discovery or designing a new product. However, even highly trained scientists and engineers are often unaware of these tools or how to best utilize them.

It is with respect to these and other considerations that the disclosure made herein is presented.

SUMMARY

Machine learning models are used to invoke a sequence of tools in response to a user request. A list of available tools is culled before a machine learning model selects from the remaining tools to generate a plan. The plan, which describes tool invocations in natural language, is then converted to code that can programmatically invoke the tools. In some configurations, the list of available tools is first culled by removing tools that do not appear in similarly described plans. The list may further be culled by removing tools that do not appear in plans generated by machine learning models. Then, a machine learning model is prompted to generate a final plan from the culled list and the user request. In some configurations, the final plan is converted to code by prompting a machine learning model to extrapolate from the code of similar plans.

Tools may be removed from consideration in at least two ways. First, a tool is culled if it is not found in any of the pre-generated plans that have a description similar to the user request. Pre-generated plans may be created by randomly selecting tools from the list of available tools. Pre-generated plans may also be created by systematically selecting all permutations of tools. In some configurations, the tools selected for a pre-generated plan are restricted to sequences of tools that have compatible output and input data types, allowing for data returned from one tool to be passed to another.

A description of each pre-generated plan may be obtained by prompting a machine learning model. For example, the prompt may include a list of one or more tools that carry out that plan and a request to generate a description for the one or more tools.

A pre-generated plan is considered similar to the user request when an embedding of the pre-generated plan's description is within a defined distance of an embedding of the user request. As such, a tool is culled from the list of available tools if it is not found in any of the pre-generated plans for which that plan's description is within the defined distance of the user request in an embedding space.

Tools also may be culled if they are not found in plans generated by machine learning models. One or more machine learning models may be provided with a prompt that includes the list of remaining tools, the user request, and a request to generate one or more plans. The plans returned by these machine learning models are not executed. Instead, any tool that is not included in at least one of the model-generated plans is culled from further consideration.

After culling tools from the list of available tools, a final plan is generated by prompting a machine learning model with a list of the remaining tools, the user request, and instructions to construct a plan. The final plan generated by the foundation model includes natural language descriptions of the invocation of tools, including how to the output of one tool is provided as input to another tool.

Once the final plan has been obtained, the natural language descriptions of tool invocations are converted into code segments that can be executed in sequence to carry out the plan. In some configurations, a foundation model converts the natural language description into code based on example conversions from natural language descriptions of tools into code.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1 illustrates generating a plan that responds to a user request.

FIG. 9 is a flow diagram of an example method for multi-stage multi-hop natural language and model execution plan generation.

DETAILED DESCRIPTION

Figure 2:
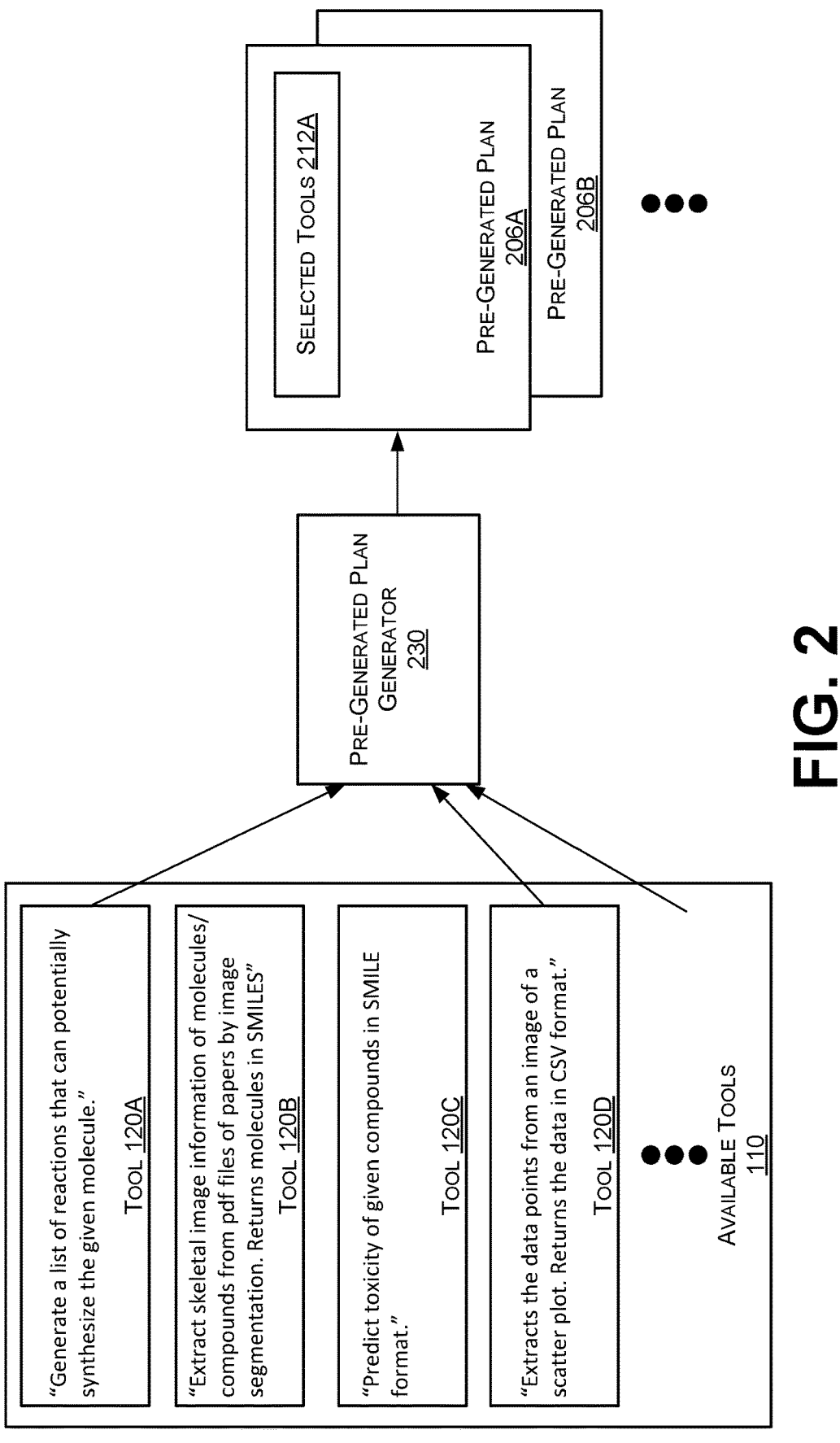
FIG. 2 illustrates creating pre-generated plans from available tools.

FIG. 1 illustrates generating a plan 106 that responds to a user request 102. User request 102 may be written in a natural language, such as English. Natural language in this context refers to language that a person might use when talking to another person. Allowing natural language prompts relieves the user of the burden of understanding specific commands, grammars, or other peculiarities of traditional human-machine interfaces. Natural language also makes it easier for a user to create prompts that combine tools.

As illustrated, user request 102 states "Extract drugs described in these ten papers, and evaluate their toxicities." This is an example of the kind of request that a scientist or engineer might provide to a software application that assists with scientific discovery. However, this is just one example request in the field of science and engineering, and science and engineering is just one domain to which user request 102 may be directed—other requests in other domains are similarly contemplated.

Planning engine 104 receives user request 102, and in conjunction with available tools 110, generates plan 106. Available tools 110 is a list of tools 120 that may be used when responding to user request 102. A tool in this context may refer to functionality of a software application, such as an application that aids with scientific discovery. A tool may also refer to a library, a plug-in, or functionality made available through an extensibility model of the software application. A tool may execute locally or remotely. Tools may be hand-written programs or utilize machine learning models.

Each tool 120 may be associated with an input schema 122 and output schema 124—descriptions of programmatic interfaces usable to invoke that tool. As illustrated, input schema 122 describes input variables 132A and 132B. Input variables may be described using programming language syntax, natural language, or a combination thereof. For example, variable 132A has a name 134A and a data type 136A similar to a description of a function parameter in a programming language. At the same time, description 138A is a natural language description of the variable. Variable 132B similarly has a name 134B ("input_compounds"), a type 136B ("array"), and a natural language description 138B ("list of input compounds."). Variables may have additional attributes, such as whether a variable is required or not for the tool to operate, a list or range of possible values for the variable, etc.

While not illustrated, output schema 124 has a similar list of output variables. Each of these output variables may have a name and a type similar to the names and types of the input variables discussed above. Additional attributes of an output variable are similarly contemplated, such as a range of allowed values. Natural language description 126 of tool 120A may be used by planning engine 104 when selecting tools for execution in response to user request 102. An example description 126 is "Generate molecules that can potentially bind to the target protein".

Plan 106 may be constructed to invoke selected tools 112, which is an ordered subset of tools 120 that was selected based on user request 102. For example, plan 106 may include tool invocation codes 130 which describe how to programmatically invoke corresponding tools 120 of selected tools 112. Plan 106 may also describe one or more orders in which tool invocation code 130 should be executed, e.g., tool 120A followed by tool 120D and then tool 120W. Plan 106 may also describe input variables supplied to each of the selected tools 112, output variables obtained from each of the selected tools 112, and how to forward the output of one tool as input to another tool. As illustrated, input 152 is provided to tool 120A, which generates output 154. Output 154 is then provided as input to tool 120W. Plan 106 may also indicate how to modify, transform, or otherwise alter values before they are provided as parameters to a tool or after they are returned by a tool. For example, output 154 may be reformatted before being provided to tool 120W as input.

Plan 106 may be put into operation by execution engine 150. Execution engine 150 may execute selected tools 112 by executing tool invocation codes 130 as defined by plan 106. As discussed briefly above, execution engine 150 may provide the outputs of some tools 120 as inputs to other tools, enabling more complex operations to satisfy user request 102. Execution engine 150 may generate response 170 to user request 102.

A natural language-based system described herein, such as a service that enables scientists and engineers to quickly and conveniently perform complex operations, increases productivity by allowing the user to interact with the service in a natural, conversational manner. Productivity is also increased because planning engine 104 may employ machine learning models to connect existing tools that would otherwise require significant manual manipulation to work together.

User request 102 and response 170 may be text-based, but other types of inputs and outputs that can be processed by foundation models may also be used by planning engine 104, tools 120, and/or execution engine 150. For example, planning engine 104 and/or execution engine 150 may similarly process images or voice commands. In the context of a science exploration application, planning engine 104 may process an image captured by a telescope. Similarly, execution engine 150 may generate a response 170 that includes a flow-chart, graphics, a video, audio, images, or any other type of media, or a combination thereof.

FIG. 2 illustrates creating pre-generated plans from available tools 110. Pre-generated plan generator 230 processes available tools 110 to create a number of pre-generated plans 206. Each of pre-generated plans 206 has one or more selected tools 212 chosen from available tools 110. Tools 120 are depicted in FIG. 2 with their descriptions 138.

In some configurations, pre-generated plan generator 230 selects tools 120 at random for inclusion in a pre-generated plan 206. Additionally, or alternatively, pre-generated plan generator 230 may systematically generate some or all possible plans with a given number of tools. For example, pre-generated plan generator 230 may create a single-tool plan 206 for each tool 120. Similarly, pre-generated plan generator 230 may systematically create a pre-generated plan 206 for every combination or every permutation of different numbers of tools. For example, pre-generated plan generator 230 may create a plan 206 for each pair of tools 120, each triplet of tools 230, etc.

In some configurations, pre-generated plan generator 230 creates plans 206 in which selected tools 212 appear in a sequence. In this scenario, the output of one tool may be provided as input to a tool that appears later in the sequence. In other configurations, selected tools 212 are partially in sequence and partially unordered or completely unordered.

To the extent selected tools 212 are ordered and values are passed between them, pre-generated plan generator 230 may ensure that the values passed between tools have compatible data types. For example, if tool 120B outputs a list of molecules in the SMILE format, and tool 120C accepts as input a compound described in a SMILE format, then pre-generated plan generator 230 will recognize this compatibility and allow pre-generated plans 206 to include these tools in sequence. However, pre-generated plan generator

230 would not allow tool 120B, which takes pdf files as input, to receive the output of tools 120C, which outputs a prediction of toxicity.

Figure 3:
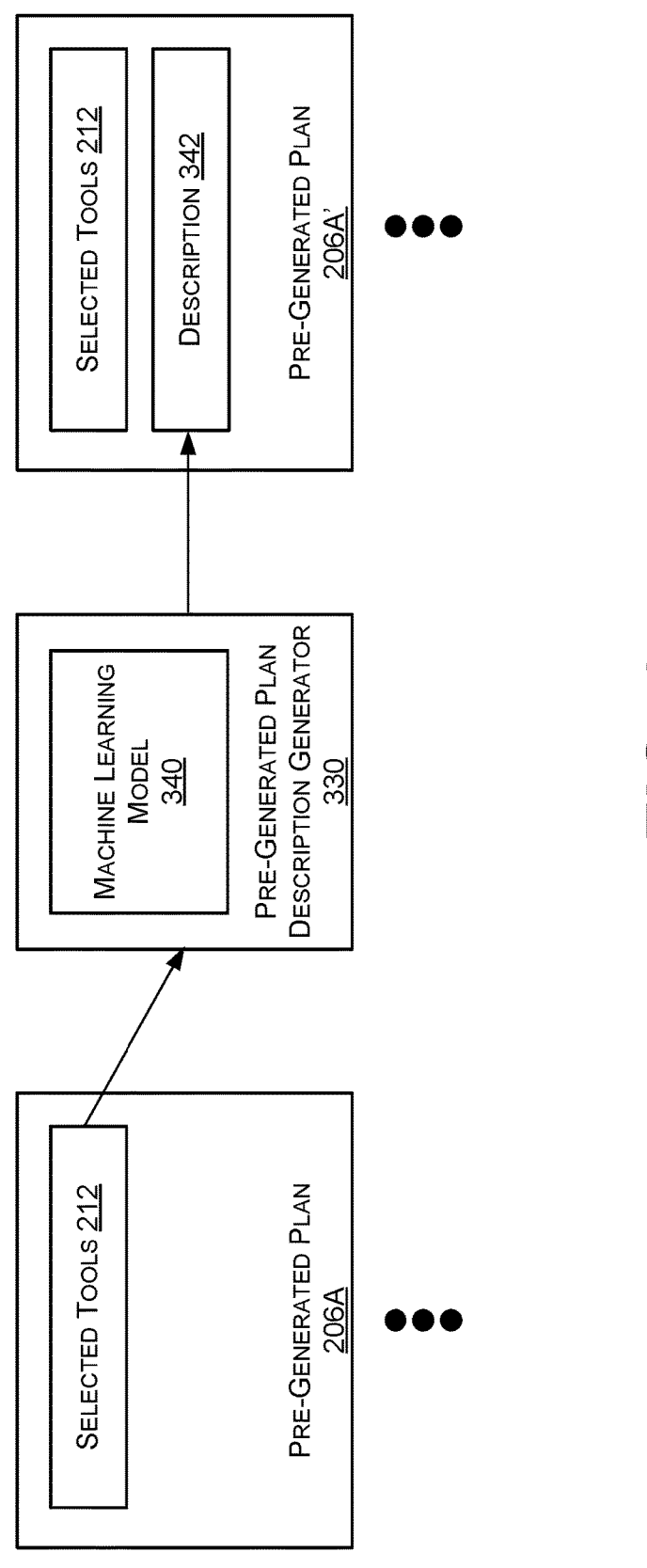
FIG. 3 illustrates generating descriptions for the pre-generated plans.

FIG. 3 illustrates generating descriptions 342 for the pre-generated plans 206. In some configurations, pre-generated plan description generator 330 generates descriptions of each pre-generated plan 206. Pre-generated plan description generator 330 receives one or more selected tools 212 from a pre-generated plan 206. Pre-generated plan description generator 330 may use machine learning model 340 to generate description 342. Specifically, pre-generated plan description generator 330 creates a prompt that includes the descriptions 138 of selected tools 212 and a request to generate a wholistic description of selected tools 212. This prompt is provided to machine learning model 340 to generate description 342.

Figure 4:
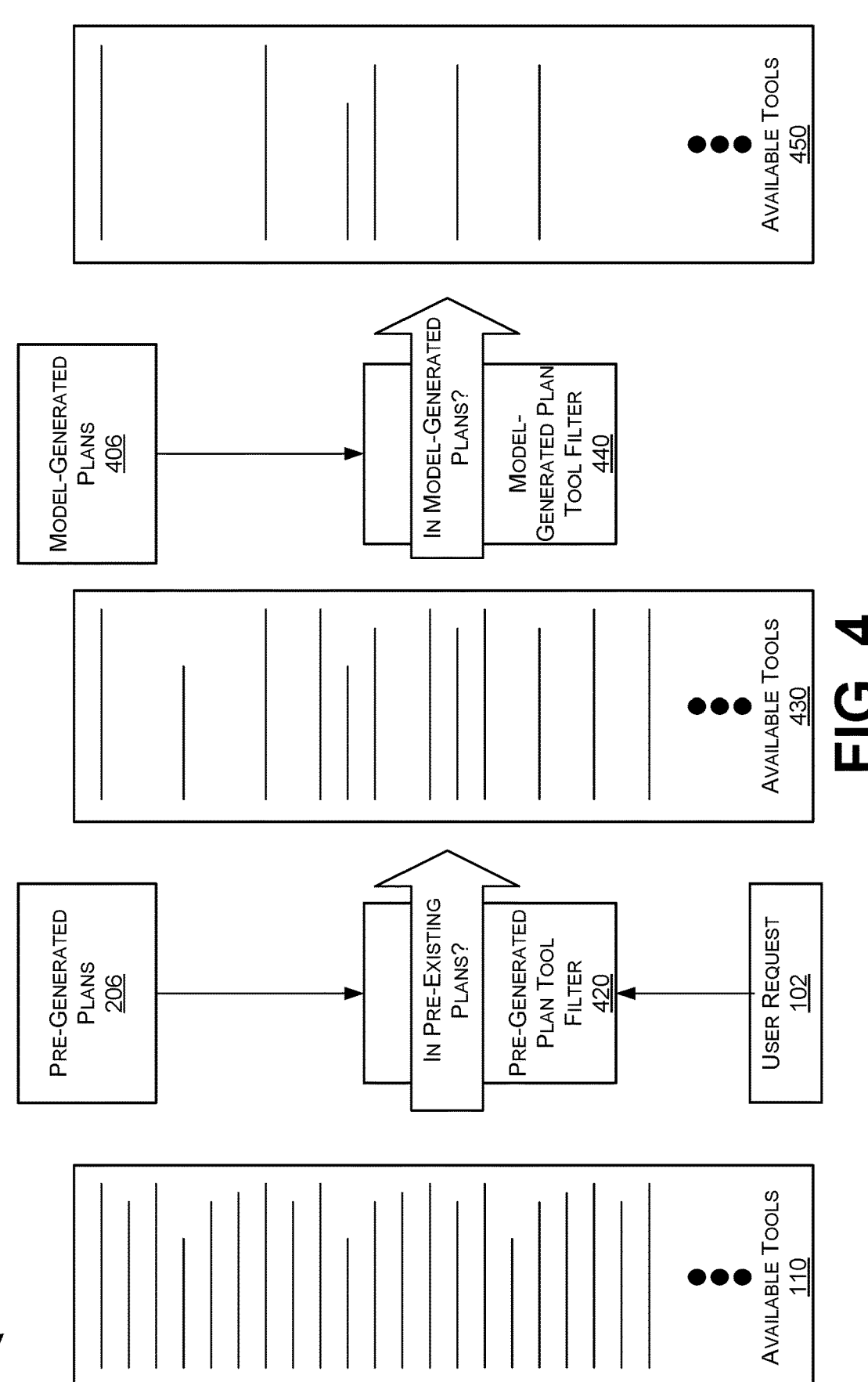
FIG. 4 illustrates culling the list of available tools.

FIG. 4 illustrates culling the list of available tools. Available tools list 110 contains the complete list of available tools usable to respond to user request 102. Pre-generated plan tool filter 420 first determines which pre-generated plans 206 are similar to user request 102. For example, pre-generated plan tool filter 420 may select pre-generated pans 206 that have an embedding within a defined distance of an embedding of user request 102, as discussed in more detail below in conjunction with FIG. 5. Tools included in pre-generated plans 206 that are similar to the user request 102 in this way are stored in available tools list 430. Tools are selected for inclusion in available tools 430 in this way because experiments have shown that tools that appear in pre-generated plans 206 with similar descriptions 342 as user request 102 are more useful when constructing plan 106. Available tools list 430 may be a new, separate list, or it may be the same available tools list 110 after culling tools that don't appear in any of the similar pre-generated plans 206.

Model-generated plan tool filter 440 culls tools from available tools 430. In some configurations, model-generated plan tool filter 440 uses the tools that remain in available tools 430 to obtain a number of model-generated plans 406, as described in more detail below in conjunction with FIG. 6. In some configurations, tools used by one of the model-generated plans 406 are selected for inclusion in tools list 450. Tools that are not used by any of model-generated plans 406 are culled.

Figure 5:
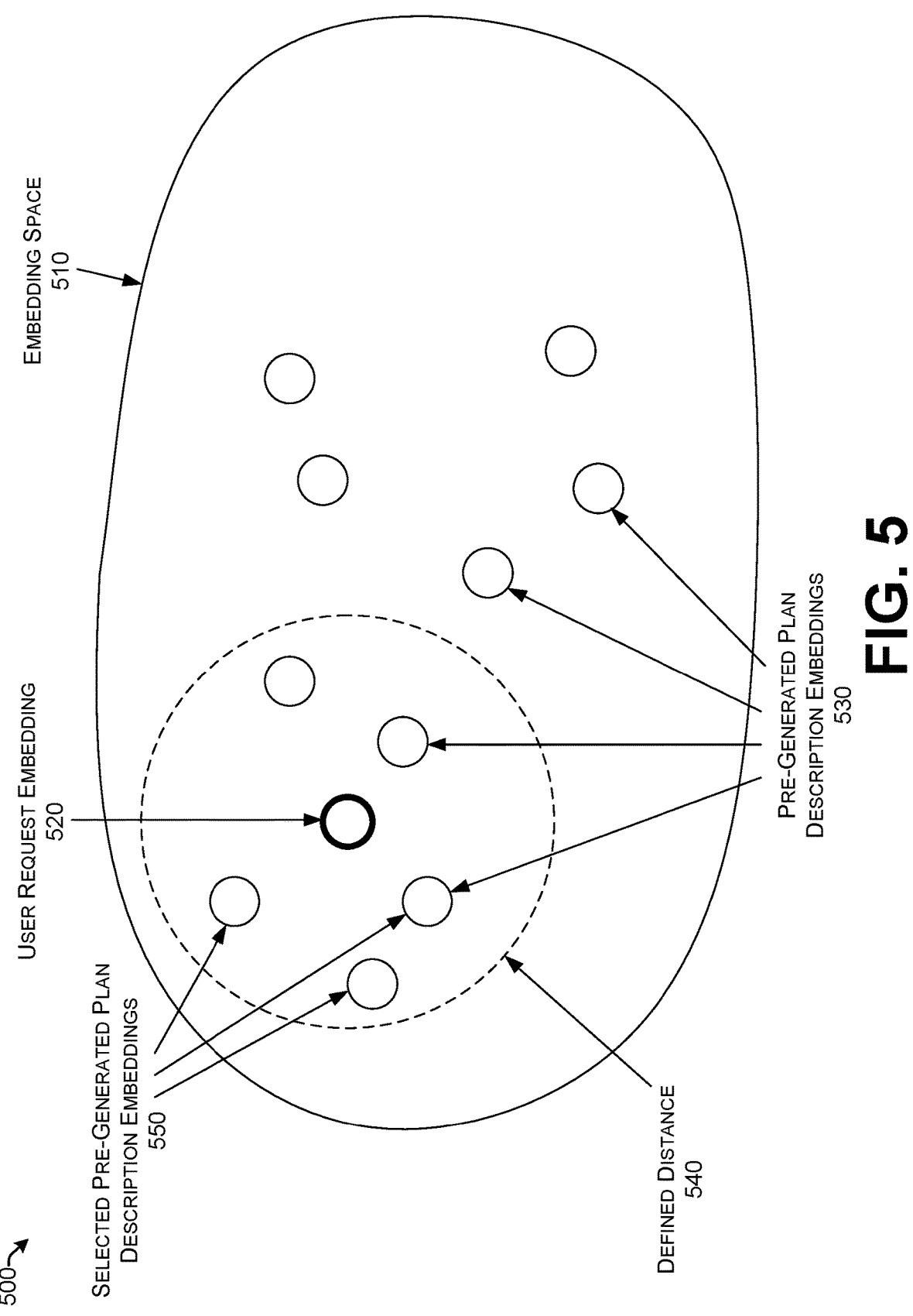
FIG. 5 illustrates identifying pre-generated plans that are associated with a user request.

FIG. 5 illustrates identifying pre-generated plans 206 that are associated with user request 102. Embedding space 510 is a multi-dimensional range of numbers where each point—as defined by an embedding vector—represents either a pre-generated plan 206 or user input 102. The arrangement of these points in this space can reflect relationships or similarities between the plans/user request.

As illustrated, user request embedding 520 is an embedding computed by applying an embedding function to user request 102. Similarly, pre-generated plan description embeddings 530 are embeddings computing by applying an embedding function—often the same embedding function applied to user request 102—to descriptions 342 of pre-generated plans 206.

Defined distance 540 illustrates how far a pre-generated plan description embedding 530 may be from user request embedding 520 to be included in selected pre-generated plan description embeddings 550. Defined distance may be computed as a Euclidian distance—the square root of the sum of the squares of the differences of each dimension within embedding space 510. A cosine similarity, Manhattan distance, and other distance measures are similarly contemplated. While illustrated in two dimensions, the distance in embedding space 510 may be multi-dimensional.

Pre-generated plan tool filter 420 identifies any tools 120 used by pre-generated plans 206 associated with selected pre-generated plan description embeddings 550. In some configurations, a union of these tools is computed. The tools identified in this way are included in available tools 430. Tools not used by pre-generated plans 206 associated with selected pre-generated plan description embeddings 550 are culled.

Figure 6:
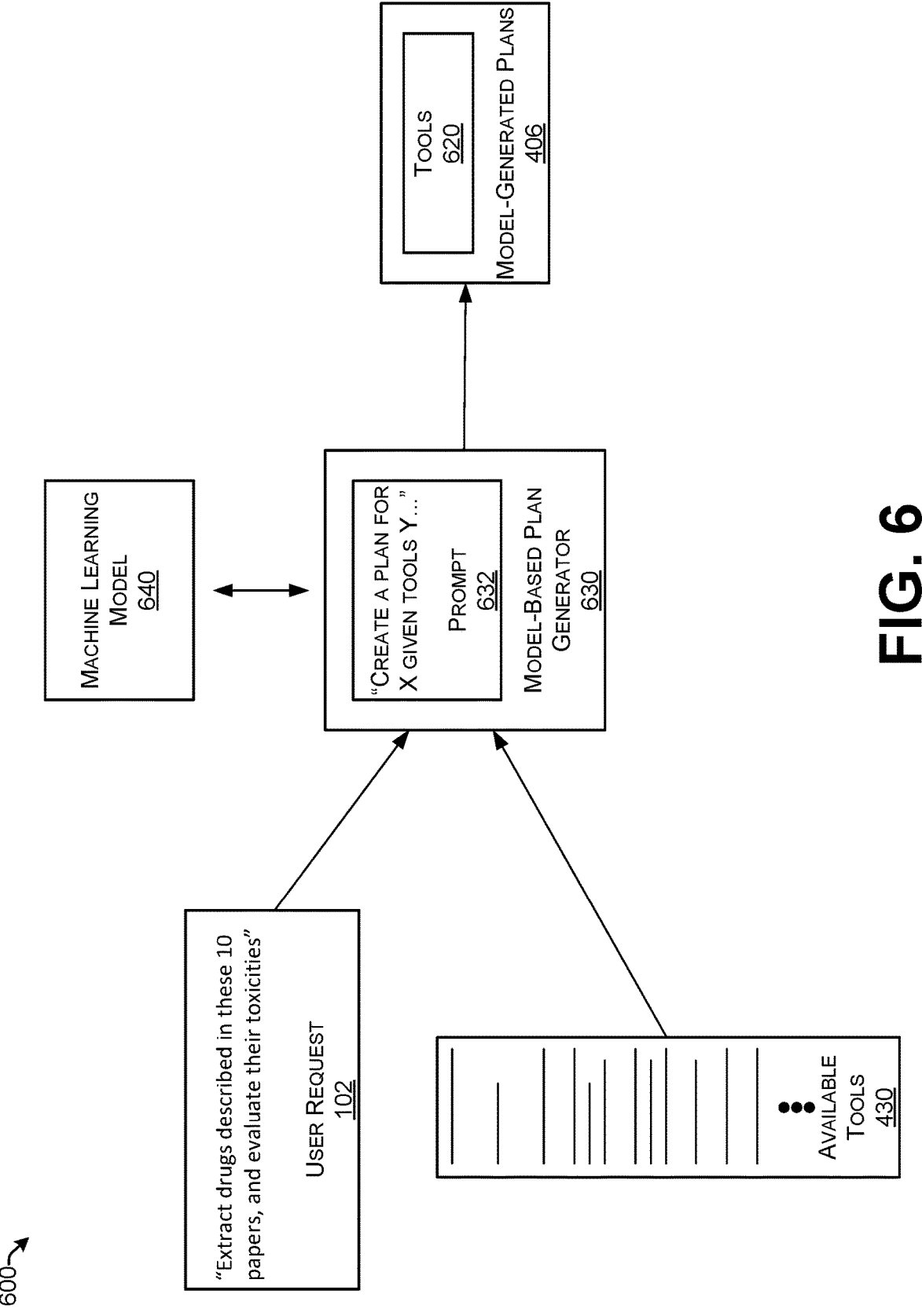
FIG. 6 illustrates generating a number of model-generated plans from an intermediate list of available tools.

FIG. 6 illustrates generating a number of model-generated plans 406 from list of available tools 430. Instead of using embeddings to find similar plans as discussed above in FIG. 5, model-based plan generator 630 leverages machine learning model 640 to generate model-generated plans 406. Specifically, model-based plan generator 630 constructs prompt 632 requesting the creation of a model-generated plan 406 that responds to user request 102. Prompt 632 is constructed with a list of tools 430 for machine learning model 640 to utilize when generating plans 406 that responds to user request 102.

Model-generated plans 406 each include a list of one or more tools 620 selected from available tools 430. As discussed above in conjunction with FIG. 4, mode-generated plan tool filter 440 may use model-generated plans 406 to further refine the list of available tools 430. Specifically, if a tool 120 included in available tools 430 is used in one of the model-generated plans 406, that tool 120 is included in available tools list 450. Any tool 120 of available tools 430 that does not appear in any of the model-generated plans 406 is culled.

Figure 7:
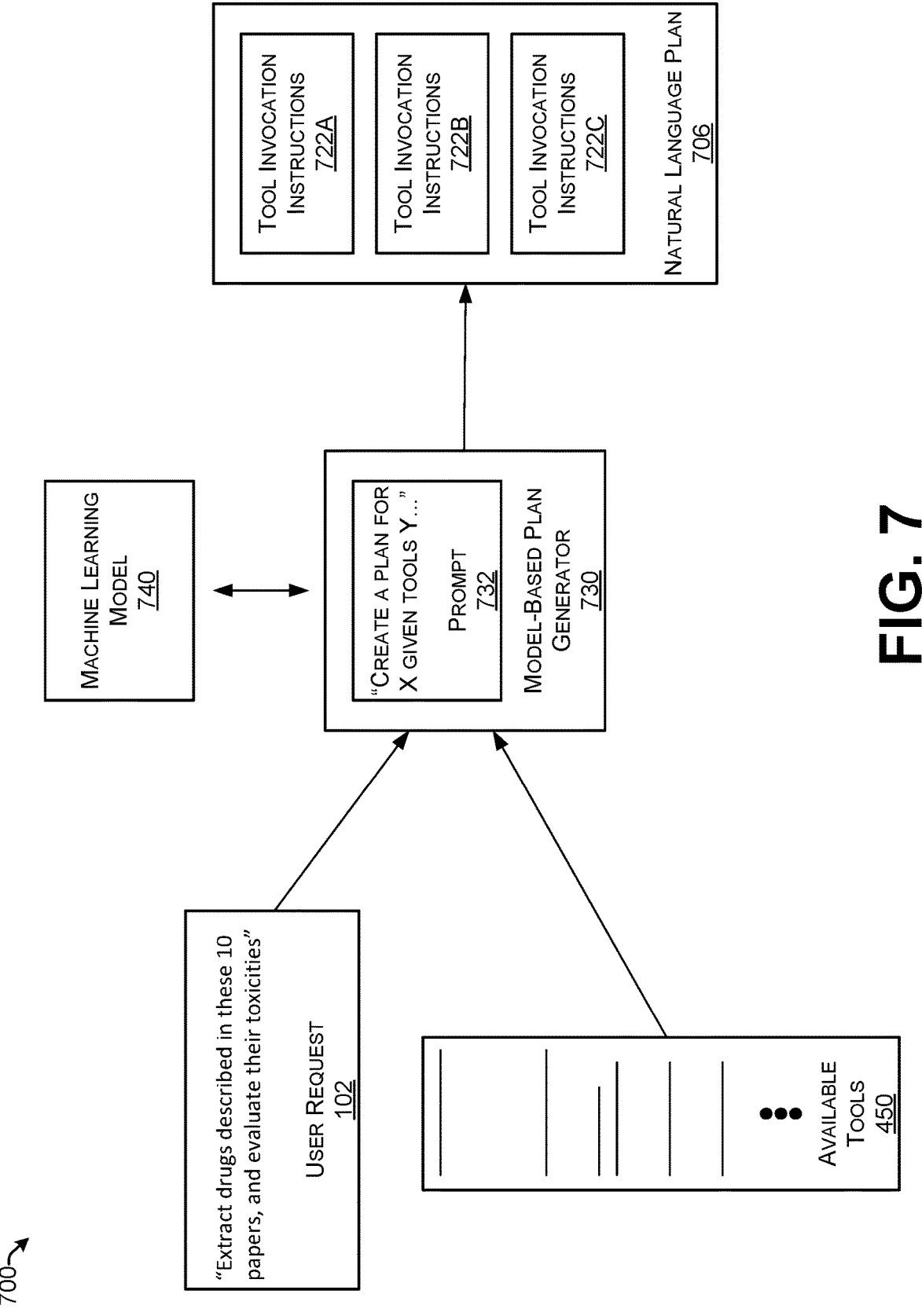
FIG. 7 illustrates generating a natural language plan based on the final list of available tools.

FIG. 7 illustrates generating a natural language plan 706 based on the final list of available tools 450. Model-based plan generator 730 constructs natural language plan 706 similar to model-based plan generator 630: prompt 732 is constructed to ask machine learning model 740 to generate a plan that responds to user request 102. Prompt 732 includes the list of available tools 450 that model 740 can choose from. The natural language plan 706 generated by machine learning model 740 contains tool invocation instructions 722. Natural language plan 706 may include an ordering of tool instructions 722, a partial ordering, or no ordering.

Figure 8:
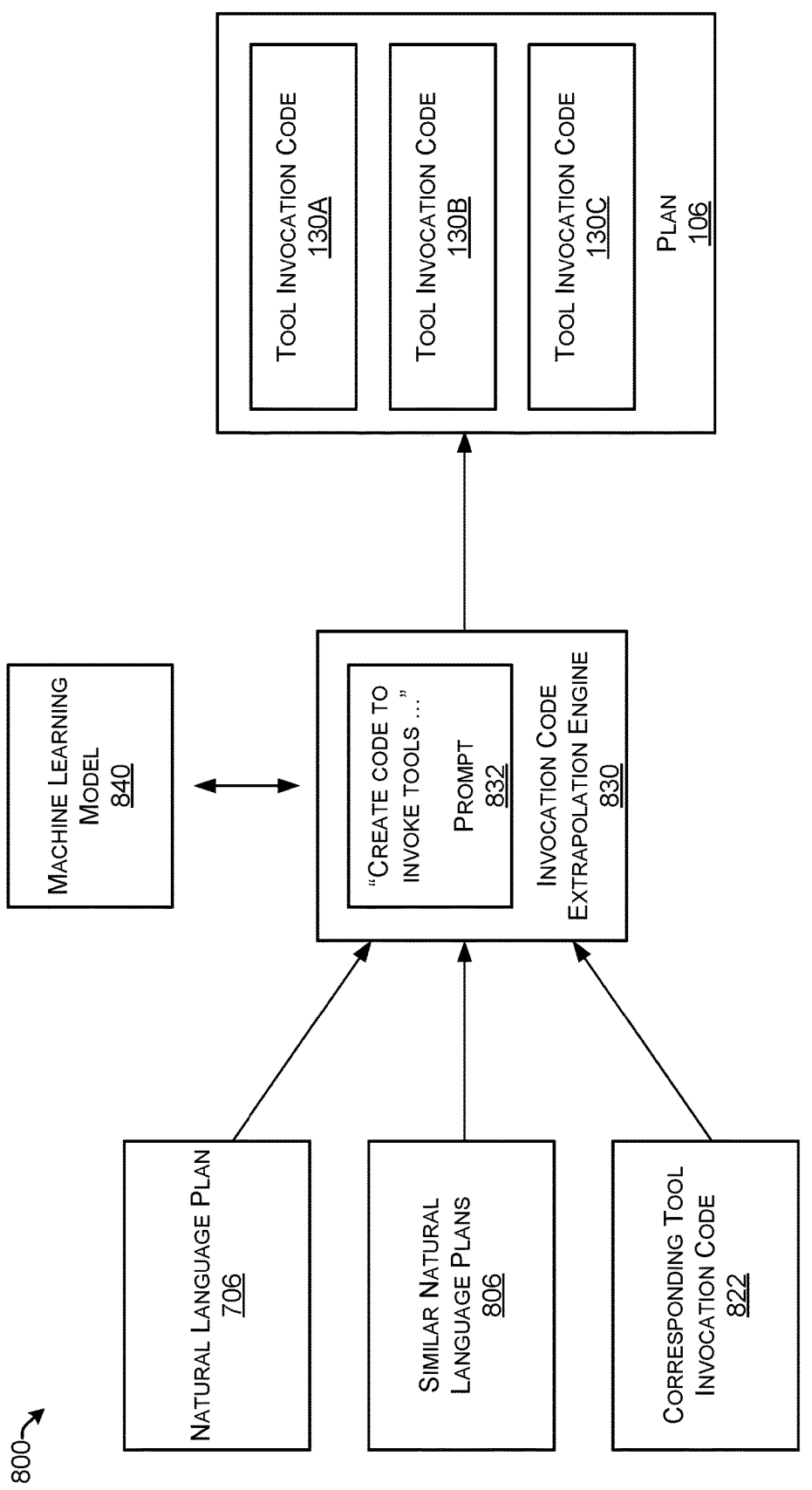
FIG. 8 illustrates converting the natural language plan to executable code.

FIG. 8 illustrates converting natural language plan 706 to executable code. Natural language plan 706 includes natural language tool invocation instructions 722 that describe how to invoke one or more of tools 120. In order to actually execute tools 120, these natural language descriptions 722 are converted into tool invocation code 130, which can be used to programmatically execute the tools referenced by natural language plan 706.

In some configurations, invocation code extrapolation engine 830 generates prompt 832 for machine learning model 840. Prompt 832 asks machine learning model 840 to extrapolate from similar natural language plans 806 and corresponding tool invocation code 822. Corresponding tool invocation code 822 includes examples of source code that can be executed by a computer to invoke the tools referenced by similar natural language plans 806. Similar natural language plans 806 may be determined to be similar to natural language plan 706 based on a comparison of plan descriptions 342, e.g., by comparing embeddings of each plan description. Additionally, or alternatively, invocation code extrapolation engine 830 may determine that natural language plan 706 is similar to natural language pans 806 when at least one tool 120 is used by both.

In some configurations, plan 106 is returned to the user for inspection, modification, or to be archived. Additionally, or alternatively, execution engine 150 may execute plan 106 by executing tool invocation code 130 in sequence. In some configurations, plan 106, as generated by machine learning model 840, includes code that formats the output of tool invocation code 130A so that it meets the input schema 122 requirements of the tool 120 invoked by tool invocation code 130B.

A sample prompt 832 is:

Your task is to convert a sequence of natural language plan into a sequence of formulas/functions that invoke tools with input variables.

Each plan has multiple steps, you have to generate a formula/function that invoke tools for each individual step. Here are some examples of generated formula/functions:

Example 1

User Request: Predict log solubility for drug Celecoxib
Step 1: Find the SMILES string of the drug Celecoxib
Tool name for this step: MoleculeInfo
Input variables for the tool above
Variable 1: Name: input_compounds, Type: array, Description: List of input compounds, Required: Yes
Variable 2: Name: input_type, Type: string, Description: The type of input compounds. It can be any of the following: name, cid, smiles, inchi, formula, Required: Yes
Output Variables for the Tool Above:
Variable 1: Name: PubChem CID, Type: integer
Variable 2: Name: Name, Type: string
Variable 3: Name: Molecule Image, Type: string
Variable 4: Name: Molecular Formula, Type: string
Variable 5: Name: Canonical SMILE, Type: string
Variable 6: Name: InChi, Type: string
Variable 7: Name: IUPAC Name, Type: string
Variable 8: Name: Synonyms, Type: array
Tool Syntax with Input Variables:
MoleculeInfo (input_compounds=array, input_type=string)
Step 2: Predict the log solubility using the SMILES as the input
Tool name for this step: DrugLogSolubility
Input variables for the tool above
Variable 1: Name: SMILES, Type: string, Description: Required: Yes
Output Variables for the Tool Above:
Variable 1: Name: SMILES, Type: string
Variable 2: Name: Cell Effective_Permeability, Type: None
Variable 3: Name: Human Intestinal_Absorption, Type: None
Variable 4: Name: P_glycoprotein_Inhibition, Type: None
Variable 5: Name: Bioavailability, Type: string
Variable 6: Name: Solubility, Type: string
Variable 7: Name: Hydration_Free_Energy, Type: None
Variable 8: Name: Lipophilicity, Type: string
Tool Syntax with Input Variables:
DrugLogSolubility (SMILES=string)
Based on the Information Available Above, Here is the Generated Function Sequence for this Plan:
MoleculeInfo (["Celecoxib"], "name")

DrugLogSolubility (Page.'Canonical SMILE')

Example 2

Task: Summarize clinical trials associated with hypertension
Step 1: Search for clinical trials that mention the disease hypertension
Tool name for this step: FindClinicalTrialsBySentences
Input variables for the tool above
Variable 1: Name: query, Type: string, Description: A description of what you want to search, Required: Yes
Variable 2: Name: max_results, Type: integer, Description: max number of results being returned, Required: No
Output Variables for the Tool Above:
Variable 1: Name: Title, Type: string
Variable 2: Name: Indication, Type: string
Variable 3: Name: Intervention, Type: string
Variable 4: Name: Study_Phase, Type: string
Variable 5: Name: Status, Type: string
Variable 6: Name: Study_Type, Type: string
Variable 7: Name: Pivotal_Trial_Prediction, Type: string
Variable 8: Name: Number_of_Patients, Type: integer
Variable 9: Name: Allocation, Type: string
Variable 10: Name: Intervention_Model, Type: string
Variable 11: Name: Masking, Type: string
Variable 12: Name: Primary_Purpose, Type: string
Variable 13: Name: Enrollment_Start_Date, Type: string
Variable 14: Name: Primary_Completion_Date, Type: string
Variable 15: Name: Primary_Endpoints, Type: string
Variable 16: Name: Age, Type: string
Variable 17: Name: Gender, Type: string
Variable 18: Name: Countries, Type: string
Variable 19: Name: Sponsor, Type: string
Variable 20: Name: Sponsor_Type, Type: string
Variable 21: Name: Additional_References, Type: string
Variable 22: Name: Related_IDs, Type: string
Variable 23: Name: Link, Type: string
Tool Syntax with Input Variables:
FindClinicalTrialsBySentences (query=string, max_results=integer)
Step 2: Summarize the clinical trials based on the given clinical trial IDs
Tool name for this step: GetTrialInfo
Input variables for the tool above
Variable 1: Name: trial_ids, Type: array, Description: (required) a list of NCT IDs or clinical trial URLs from clinicaltrials.gov, such as ["NCT04788784", "NCT04135443"] or ["://clinicaltrials.gov/show/NCT04788784", "://clinicaltrials.gov/show/NCT04135443"].
Use quotation marks around the IDs or URLs, Required: Yes
Output Variables for the Tool Above:
Variable 1: Name: trial_id, Type: string
Variable 2: Name: address, Type: string
Variable 3: Name: official_title, Type: string
Variable 4: Name: status, Type: string
Variable 5: Name: brief_summary, Type: string
Variable 6: Name: link, Type: string
Variable 7: Name: facility, Type: string
Variable 8: Name: city, Type: string
Variable 9: Name: state, Type: string
Variable 10: Name: zipcode, Type: string
Variable 11: Name: country, Type: string Tool Syntax with Input Variables:
  GetTrialInfo (trial_ids=array)
Based on the Information Available Above, Here is the
Generated Function Sequence for this Plan:
  FindClinicalStudies("Hypertension", " ")
  SummarizeEligibilityCriteria(Page.Link)

Example 3

Task: Find geographical information on clinical trials
  being conducted on diabetes
Step 1: Search for clinical trials for a given disease or term
Tool name for this step: FindClinicalTrialsBySentences
Input Variables for the Tool Above
  Variable 1: Name: query, Type: string, Description: A
    description of what you want to search, Required: Yes
  Variable 2: Name: max_results, Type: integer, Descrip-
    tion: max number of results being returned, Required:
    No
Output Variables for the Tool Above:
  Variable 1: Name: Title, Type: string
  Variable 2: Name: Indication, Type: string
  Variable 3: Name: Intervention, Type: string
  Variable 4: Name: Study_Phase, Type: string
  Variable 5: Name: Status, Type: string
  Variable 6: Name: Study_Type, Type: string
  Variable 7: Name: Pivotal_Trial_Prediction, Type: string
  Variable 8: Name: Number_of_Patients, Type: integer
  Variable 9: Name: Allocation, Type: string
  Variable 10: Name: Intervention_Model, Type: string
  Variable 11: Name: Masking, Type: string
  Variable 12: Name: Primary_Purpose, Type: string
  Variable 13: Name: Enrollment_Start_Date, Type: string
  Variable 14: Name: Primary_Completion_Date, Type:
    string
  Variable 15: Name: Primary_Endpoints, Type: string
  Variable 16: Name: Age, Type: string
  Variable 17: Name: Gender, Type: string
  Variable 18: Name: Countries, Type: string
  Variable 19: Name: Sponsor, Type: string
  Variable 20: Name: Sponsor_Type, Type: string
  Variable 21: Name: Additional_References, Type: string
  Variable 22: Name: Related_IDs, Type: string
  Variable 23: Name: Link, Type: string
Tool Syntax with Input Variables:
  FindClinicalTrialsBySentences          (query=string,
    max_results=integer)
  Step 2: Extracted geographical information such as city,
    zipcode etc for these trials
  Tool name for this step: GetTrialInfo
Input Variables for the Tool Above
  Variable 1: Name: trial_ids, Type: array, Description:
    (required) a list of NCT IDs or clinical trial URLs from
    clinicaltrials.gov,     such     as     ["NCT04788784",
    "NCT04135443"]     or     ["//clinicaltrials.gov/show/
    NCT04788784",          "://clinicaltrials.gov/show/
    NCT04135443"].
  Use quotation marks around the IDs or URLs, Required:
    Yes
Output Variables for the Tool Above:
  Variable 1: Name: trial_id, Type: string
  Variable 2: Name: address, Type: string
  Variable 3: Name: official_title, Type: string
  Variable 4: Name: status, Type: string
  Variable 5: Name: brief_summary, Type: string
  Variable 6: Name: link, Type: string
  Variable 7: Name: facility, Type: string Variable 8: Name: city, Type: string
  Variable 9: Name: state, Type: string
  Variable 10: Name: zipcode, Type: string
  Variable 11: Name: country, Type: string
Tool Syntax with Input Variables:
  GetTrialInfo (trial_ids=array)
Based on the Information Available Above, Here is the
Generated Function Sequence for this Plan:
  FindClinicalTrialsBySentences("diabetes", 4)
  GetTrialInfo(Page.Link)
Based on the Examples Above, Answer the Following
Question.
  Task: Find possible side effects of the drug Celecoxib
  Step 1: Find the SMILES string of the drug Celecoxib
  Tool name for this step: MoleculeInfo
Input Variables for the Tool Above
  Variable 1: Name: input_compounds, Type: array,
    Description: List of input compounds, Required: Yes
  Variable 2: Name: input_type, Type: string, Description:
    The type of input compounds. It can be any of the
    following: name, cid, smiles, inchi, formula, Required:
    Yes
Output Variables for the Tool Above:
  Variable 1: Name: PubChem CID, Type: integer
  Variable 2: Name: Name, Type: string
  Variable 3: Name: Molecule Image, Type: string
  Variable 4: Name: Molecular Formula, Type: string
  Variable 5: Name: Canonical SMILE, Type: string
  Variable 6: Name: InChi, Type: string
  Variable 7: Name: IUPAC Name, Type: string
  Variable 8: Name: Synonyms, Type: array
Tool Syntax with Input Variables:
  MoleculeInfo                  (input_compounds=array,
    input_type=string)
  Step 2: Predict the side effects of the drug using SMILES
    input
  Tool name for this step: PredictCompoundSideEffects
Input Variables for the Tool Above
  Variable 1: Name: SMILES, Type: array, Description: List
    of SMILES to be processed, Required: Yes
  Variable 2: Name: threshold, Type: number, Description:
    Cut-off points to decide whether it is a positive or
    negative prediction. It should be between 0.0 and 1.0
    and the default is 0.5, Required: No
Output Variables for the Tool Above:
  Variable 1: Name: SMILES, Type: string
  Variable 2: Name: Molecule_2D_Structure, Type: None
  Variable 3: Name: Side_Effects, Type: None
Tool Syntax with Input Variables:
  PredictCompoundSideEffects             (SMILES=array,
    threshold=number)
  Based on the Information Available Above, Generated
    Function Sequence for this Plan would Be?
  In this example, prompt 832 begins by instructing
machine learning model 840 of the task at hand—"convert
a sequence of natural language plan into a sequence of
formulas/functions that invoke tools with input variables."
Three examples of conversions between natural language
plans 706 and plans 106 that include tool invocation code
130 are then listed. Each example has one or more steps,
where each step invokes a tool. For each step, the natural
language description 126 of the tool 120 is listed, as is the
name of the tool, input variables known from input schema
122, and output variables known from output schema 124.
Then, "Tool syntax with input variables" is listed, indicating
how source code may be used to invoke the tool. Input and
output variables may be listed with a variable name 134, a variable type 136, constraints on the variable such as a maximum allowed range, required input variables, etc.

In addition to the examples, another portion of prompt 832 lists what is known about the tool invocation instructions 722 in natural language plan 706 including input and output variables. Model 840 is then asked, "Based on the information available above, generated function sequence for this plan would be?"

FIG. 9 is a flow diagram of an example method for multi-stage multi-hop natural language and model execution plan generation. Routine 900 begins at operation 902, where a User request 102 is received. For example, the user request may include the text "Extract drugs described in these ten papers, and evaluate their toxicities." This user request may also reference the ten papers.

Next at operation 904, a plurality of pre-generated plans 206 with descriptions 342 similar to the user request 102 are identified, as discussed above in conjunction with FIG. 2. Pre-generated plans 206 may comprehensively represent all some or all combinations of tools 110.

Next at operation 906, a first list of tools 430 that were used by at least one of the pre-generated plans 206 is created, as discussed above in conjunction with FIG. 4. This represents a culling of all available tools 110.

Next at operation 908, a plurality of model-generated plans 406 are generated based on user request 102 and available tools 430, as discussed above in conjunction with FIGS. 4 and 6.

Next at operation 910, a second list of available tools 450 is generated by selecting tools 120 that are included in one of the model-generated plans 406, as discussed in conjunction with FIG. 4.

Next, at operation 912, a machine learning model 740 is used to generate a natural language plan 706 that responds to user request 102, as discussed above in conjunction with FIG. 7.

Next, at operation 914, a natural language description 722 of invoking one of the second list of tools 450 is converted to source code 130 capable of programmatically invoking that tool, as discussed above in conjunction with FIG. 8.

Figure 10:
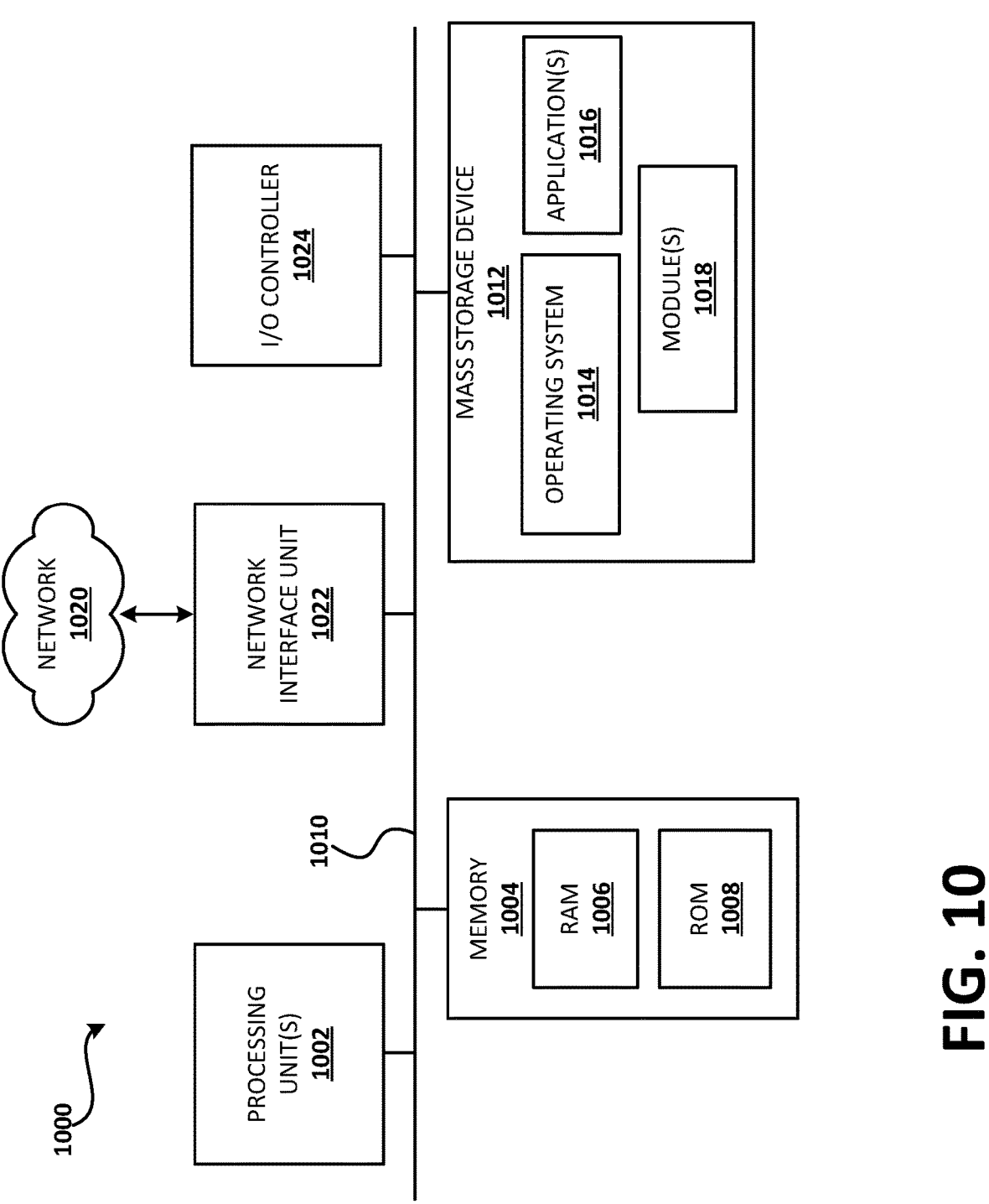
FIG. 10 is a computer architecture diagram illustrating an illustrative computer hardware and software architecture for a computing system capable of implementing aspects of the techniques and technologies presented herein.

FIG. 10 shows additional details of an example computer architecture 1000 for a device, such as a computer or a server configured as part of the systems described herein, capable of executing computer instructions (e.g., a module or a program component described herein). The computer architecture 1000 illustrated in FIG. 10 includes processing unit(s) 1002, a system memory 1004, including a random-access memory 1006 ("RAM") and a read-only memory ("ROM") 1008, and a system bus 1010 that couples the memory 1004 to the processing unit(s) 1002. The processing unit(s) 1002 include one or more hardware processors and may also comprise or be part of a processing system. In various examples, the processing unit(s) 1002 of the processing system are distributed. Stated another way, one processing unit 1002 may be located in a first location (e.g., a rack within a datacenter) while another processing unit 1002 of the processing system is located in a second location separate from the first location.

Processing unit(s), such as processing unit(s) 1002, can represent, for example, a CPU-type processing unit, a GPU-type processing unit, a neural processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 1000, such as during startup, is stored in the ROM 1008. The computer architecture 1000 further includes a mass storage device 1012 for storing an operating system 1014, application(s) 1016, modules 1018, and other data described herein. For example, planning engine 104 introduced in FIG. 1 may be stored in whole or part in the mass storage device 1012.

The mass storage device 1012 is connected to processing unit(s) 1002 through a mass storage controller connected to the bus 1010. The mass storage device 1012 and its associated computer-readable media provide non-volatile storage for the computer architecture 1000. Although the description of computer-readable media contained herein refers to a mass storage device, it should be appreciated by those tooled in the art that computer-readable media can be any available computer-readable storage media or communication media that can be accessed by the computer architecture 1000.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 1000 may operate in a networked environment using logical connections to remote computers through the network 1020. The computer architecture 1000 may connect to the network 1020 through a network interface unit 1022 connected to the bus 1010. The computer architecture 1000 also may include an input/output controller 1024 for receiving and processing input from a number of other devices, including a keyboard, mouse, touch, or electronic stylus or pen. Similarly, the input/output controller 1024 may provide output to a display screen, a printer, or other type of output device.

It should be appreciated that the software components described herein may, when loaded into the processing unit(s) 1002 and executed, transform the processing unit(s) 1002 and the overall computer architecture 1000 from a general-purpose computing system into a special-purpose computing system customized to facilitate the functionality presented herein. The processing unit(s) 1002 may be constructed from any number of transistors or other discrete circuit elements, which may individually or collectively assume any number of states. More specifically, the processing unit(s) 1002 may operate as a finite-state machine, in response to executable instructions contained within the software modules disclosed herein. These computer-executable instructions may transform the processing unit(s) 1002 by specifying how the processing unit(s) 1002 transition between states, thereby transforming the transistors or other discrete hardware elements constituting the processing unit (s) 1002.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Illustrative Embodiments

The following clauses describe multiple possible embodiments for implementing the features described in this disclosure. The various embodiments described herein are not limiting nor is every feature from any given embodiment required to be present in another embodiment. Any two or more of the embodiments may be combined together unless context clearly indicates otherwise. As used herein in this document "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

Example 1: A method comprising: receiving a user request; identifying a plurality of pre-generated plans with descriptions similar to the user request, wherein each of the plurality of pre-generated plans references one or more tools; generating a first list of tools by taking a union of the one or more tools of each of the plurality of pre-generated plans; generating a plurality of model-generated plans from the user request and the first list of tools, wherein each of the plurality of model-generated plans references one or more tools; generating a second list of tools by taking a union of the one or more tools of each of the plurality of model generated plans; and providing a machine learning model with a prompt that includes the user request and that asks the machine learning model to generate a plan that responds to the user request by invoking one of the second list of tools; and invoking the plan.

Example 2: The method of Example 1, wherein the plan comprises a natural language description of invoking the one of the second list of tools, the method further comprising: converting the natural language description of invoking the one of the second list of tools to source code capable of programmatically invoking the one of the second list of tools, wherein invoking the plan comprises invoking the source code capable of programmatically invoking the one of the second list of tools.

Example 3: The method of Example 2, wherein the natural language description of invoking the tool is converted to the source code capable of programmatically invoking the tool by: providing a second machine learning model with a prompt that includes an example natural language description of invoking the tool and corresponding example source code capable of programmatically invoking the tool.

Example 4: The method of Example 1, wherein the pre-generated plans are constructed by randomly selecting tools from a list of available tools.

Example 5: The method of Example 4, wherein the tools of an individual pre-generated plan are selected such that values passed between tools have compatible data types.

Example 6: The method of Example 1, wherein an individual pre-generated plan is determined to be similar to the use request based on a determination that an embedding of the individual pre-generated plan is within a defined distance of an embedding of the user request.

Example 7: The method of Example 1, wherein the plurality of model-generated plans are generated by providing a model generation prompt to a machine learning model, wherein the model generation prompt includes the first list of tools, the user prompt, and a request to generate the plurality of model-generated plans from the first list of tools.

Example 8: A system comprising: a processing unit; and a computer-readable storage medium having computer-executable instructions stored thereupon, which, when executed by the processing unit, cause the processing unit to: receive a user request; identify a plurality of pre-generated plans with descriptions similar to the user request, wherein each of the plurality of pre-generated plans references one or more tools; generate a first list of tools by taking a union of the one or more tools of each of the plurality of pre-generated plans; generate a plurality of model-generated plans based on the user request and the first list of tools, wherein each of the plurality of model-generated plans references one or more tools; generate a second list of tools by taking a union of the one or more tools of each of the plurality of model generated plans; and provide a machine learning model with a prompt that includes the user request and that asks the machine learning model to generate a plan that responds to the user request by invoking one of the second list of tools; convert a natural language description of invoking the one of the second list of tools to source code capable of programmatically invoking the one of the second list of tools invoke the plan.

Example 9: The system of Example 8, wherein the user request comprises a natural language description of a task, and wherein invoking the plan invokes source code that performs the task.

Example 10: The system of Example 8, wherein generating the first list of tools by taking the union of the one or more tools of each of the plurality of pre-generated plans comprises including an individual tool in the first list of tools when the individual tool is used by at least one of the plurality of pre-generated plans.

Example 11: The system of Example 8, wherein a description is generated for an individual pre-generated plan of the plurality of pre-generated plans by submitting a prompt to a machine learning model that includes the one or more tools referenced by the individual pre-generated plan and instructions to generate a description for the pre-generated plan.

Example 12: The system of Example 8, wherein identifying the plurality of pre-generated plans comprises selecting pre-generated plans that have an embedding within a defined distance of an embedding of the user request.

Example 13: The system of Example 8, wherein the pre-generated plans are constructed by systematically combining all permutations of tools.

Example 14: The system of Example 8, wherein the plan comprises a plurality of tools selected from the second list of tools.

Example 15: The system of Example 14, wherein the plan receives an output from a first of the plurality of tools selected from the second list of tools and provides the output as input to a second of the plurality of tools selected from the second list of tools.

Example 16: A computer-readable storage medium having encoded thereon computer-readable instructions that when executed by a processing unit causes a system to: receive a user request; generate a plan that, when executed, responds to the user request, wherein the plan comprises at least one natural language description of a tool invocation; convert the at least one natural language description of the tool invocation to tool invocation code by providing a machine learning model with a prompt that includes an example natural language description of invoking the tool and corresponding example source code capable of programmatically invoking the tool; and invoke the plan by invoking at least the tool invocation code.

Example 17: The computer-readable storage medium of Example 16, wherein the prompt includes a list of input variables provided to a tool referenced by the example natural language description and a list of output variables received from the tool referenced by the example natural language description.

Example 18: The computer-readable storage medium of Example 16, wherein the prompt includes example source code invocations of at least one tool referenced by the example natural language description.

Example 19: The computer-readable storage medium of Example 16, wherein the example natural language description of invoking the tool and corresponding example source code capable of programmatically invoking the tools are part of an example plan, wherein the example plan is selected for inclusion in the prompt based on having a tool in common with the plan.

Example 20: The computer-readable storage medium of Example 15, wherein the computer-readable instructions further cause the system to: identify a plurality of pre-generated plans with descriptions similar to the user request, wherein each of the plurality of pre-generated plans references one or more tools; generate a first list of tools by taking a union of the one or more tools of each of the plurality of pre-generated plans; generate a plurality of model-generated plans from the user request and the first list of tools, wherein each of the plurality of model-generated plans references one or more tools; generate a second list of tools by taking a union of the one or more tools of each of the plurality of model generated plans; and provide a machine learning model with a prompt that includes the user request and that asks the machine learning model to generate the plan that responds to the user request by invoking one of the second list of tools.

Conclusion

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The terms "a," "an," "the" and similar referents used in the context of describing the invention are to be construed to cover both the singular and the plural unless otherwise indicated herein or clearly contradicted by context. The terms "based on," "based upon," and similar referents are to be construed as meaning "based at least in part" which includes being "based in part" and "based in whole," unless otherwise indicated or clearly contradicted by context. The terms "portion," "part," or similar referents are to be construed as meaning at least a portion or part of the whole including up to the entire noun referenced.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Furthermore, references have been made to publications, patents and/or patent applications throughout this specification. Each of the cited references is individually incorporated herein by reference for its particular cited teachings as well as for all that it discloses.

What is claimed is:

1. A method comprising:
receiving a user request;
identifying a plurality of pre-generated plans that have embeddings within a defined distance of an embedding of the user request, wherein each of the plurality of pre-generated plans references one or more tools of a plurality of available tools;
identifying tools referenced by at least one of the identified plurality of pre-generated plans as a first plurality of tools;
generating a plurality of model-generated plans that respond to the user request and that are limited to using at least one of the first plurality of tools;
identifying tools referenced by at least one of the plurality of model-generated plans as a second plurality of tools; and
providing a machine learning model with a prompt that instructs the machine learning model to generate a plan that responds to the user request and that is limited to using at least one of the second list of tools; and
invoking the plan.

2. The method of claim 1, wherein the plan comprises a natural language description of invoking the at least one of the second plurality of tools, the method further comprising:
converting the natural language description of invoking the at least one of the second plurality of tools to source code capable of programmatically invoking the at least one of the second plurality of tools, wherein invoking the plan comprises invoking the source code capable of programmatically invoking the at least one of the second plurality of tools.

3. The method of claim 2, wherein the natural language description of invoking the at least one of the second plurality of tools is converted to the source code capable of programmatically invoking the at least one of the second plurality of tools by:
providing a second machine learning model with a prompt that includes an example natural language description of invoking the at least one of the second plurality of tools and corresponding example source code capable of programmatically invoking the tool.

4. The method of claim 1, wherein an individual pre-generated plan of the plurality of pre-generated plans is constructed by randomly selecting tools from a list of available tools.

5. The method of claim 4, wherein the tools of the individual pre-generated plan of the plurality of pre-generated plans are selected such that values passed between the tools have compatible data types.

6. The method of claim 1, wherein the plurality of model-generated plans are generated by providing a model generation prompt to a third machine learning model, wherein the model generation prompt includes a list of the first plurality of tools, the user prompt, and a request to generate the plurality of model-generated plans using at least one of the first list of tools.

7. A system comprising:
a processing unit; and
a computer-readable storage medium having computer-executable instructions stored thereupon, which, when executed by the processing unit, cause the processing unit to:
receive a user request;
identify a plurality of pre-generated plans that have embeddings within a defined distance of an embedding of the user request, wherein each of the plurality of pre-generated plans references one or more tools of a plurality of available tools;
identify tools referenced by at least one of the identified plurality of pre-generated plans as a first plurality of tools;
generate a plurality of model-generated plans that respond to the user request and that are limited to using at least one of the first plurality of tools;
identify tools referenced by at least one of the plurality of model-generated plans as a second plurality of tools;
provide a machine learning model with a prompt that instructs the machine learning model to generate a plan that responds to the user request and that is limited to using at least one of the second plurality of tools;
convert a natural language description included in the plan of invoking the one of the second plurality of tools to source code capable of programmatically invoking the one of the second plurality of tools; and
invoke the plan.

8. The system of claim 7, wherein the user request comprises a natural language description of a task, and wherein invoking the plan invokes source code that performs the task.

9. The system of claim 7, wherein an embedding of one of the plurality of pre-generated plans is computed of a description of the one of the plurality of pre-generated plans, wherein the description is generated for an individual pre-generated plan of the plurality of pre-generated plans by submitting a prompt to an individual machine learning model that includes the one or more tools referenced by the individual pre-generated plan and instructions to generate a description for the pre-generated plan.

10. The system of claim 7, wherein the pre-generated plans are constructed by systematically combining all permutations of tools.

11. The system of claim 7, wherein the plan comprises a third plurality of tools selected from the second plurality of tools.

12. The system of claim 11, wherein the plan receives an output from a first of the third plurality of tools and provides the output as input to a second of the third plurality of tools.

13. A computer-readable storage medium having encoded thereon computer-readable instructions that when executed by a processing unit causes a system to:

receive a user request;

identify a plurality of pre-generated plans that have embeddings within a defined distance of an embedding of the user request, wherein each of the plurality of pre-generated plans references one or more tools of a plurality of available tools;

identify tools referenced by at least one of the identified plurality of pre-generated plans as a first plurality of tools;

generate a plurality of model-generated plans that respond to the user request using tools selected from the first plurality of tools;

identify tools referenced by at least one of the plurality of model-generated plans as a second plurality of tools;

generate a plan that, when executed, responds to the user request, wherein the plan comprises at least one natural language description of a tool invocation, wherein the plan is generated by providing a first machine learning model with instructions to generate the plan using tools selected from the second plurality of tools;

convert the at least one natural language description of the tool invocation to tool invocation code by providing a second machine learning model with a prompt that includes an example natural language description of invoking the tool and corresponding example source code capable of programmatically invoking the tool; and invoke the plan by invoking at least the tool invocation code.

14. The computer-readable storage medium of claim 13, wherein the prompt includes a list of input variables provided to a tool referenced by the example natural language description and a list of output variables received from the tool referenced by the example natural language description.

15. The computer-readable storage medium of claim 13, wherein the prompt includes example source code invocations of at least one tool referenced by the example natural language description.

16. The computer-readable storage medium of claim 13, wherein the example natural language description of invoking the tool and corresponding example source code capable of programmatically invoking the tools are part of an example plan, wherein the example plan is selected for inclusion in the prompt based on having a tool in common with the plan.

* * * * *